US012688700B2

(12) United States Patent
Mimoun et al.

(10) Patent No.: US 12,688,700 B2
(45) Date of Patent: Jul. 21, 2026

(54) METHOD FOR DETECTING AN OBJECT IN A ROAD SURFACE, METHOD FOR AUTONOMOUS DRIVING AND AUTOMOTIVE LIGHTING DEVICE

(71) Applicant: VALEO VISION, Bobigny (FR)

(72) Inventors: Mickael Mimoun, Bobigny (FR); Yasser Almehio, Bobigny (FR)

(73) Assignee: Valeo Vision, Bobigny (FR)

( * ) Notice: Subject to any disclaimer, the term of this patent is extended or adjusted under 35 U.S.C. 154(b) by 36 days.

(21) Appl. No.: 18/567,620

(22) PCT Filed: Jun. 20, 2022

(86) PCT No.: PCT/EP2022/066771
§ 371 (c)(1),
(2) Date: Dec. 6, 2023

(87) PCT Pub. No.: WO2022/263685
PCT Pub. Date: Dec. 22, 2022

(65) Prior Publication Data
US 2024/0290106 A1 Aug. 29, 2024

(30) Foreign Application Priority Data
Jun. 18, 2021 (FR) ...................................... 2106503

(51) Int. Cl.
*G06V 20/58* (2022.01)
*B60Q 1/00* (2006.01)
(Continued)

(52) U.S. Cl.
CPC .......... *G06V 20/58* (2022.01); *B60Q 1/0023* (2013.01); *B60Q 1/04* (2013.01); *G01B 11/25* (2013.01);
(Continued)

(58) Field of Classification Search
CPC .... G06V 20/58; G06V 10/145; G06V 10/141; G06V 10/82; G06V 20/56; B60Q 1/0023;
(Continued)

(56) References Cited

U.S. PATENT DOCUMENTS

| | | | |
|---|---|---|---|
| 9,297,641 B2 | 3/2016 | Stein | |
| 9,641,807 B2 | 5/2017 | Schuder et al. | |

(Continued)

FOREIGN PATENT DOCUMENTS

| | | | | |
|---|---|---|---|---|
| CN | 108732589 A | * | 11/2018 | ........... G06V 10/774 |
| CN | 110045389 A | | 7/2019 | |

(Continued)

OTHER PUBLICATIONS

Original and translation of CN108732589A (Year: 2018).*
(Continued)

*Primary Examiner* — Frederick M Brushaber
(74) *Attorney, Agent, or Firm* — Valeo Vision

(57) ABSTRACT
A method for detecting an object in a road surface. The method includes projecting a light pattern on the road surface, acquiring an image of the projected light pattern, detecting a shadow in the acquired image and using some features of the shadow to obtain information about features of an object. The invention also provides a method for autonomous driving using this object detection and an automotive lighting device.

13 Claims, 2 Drawing Sheets

(51) Int. Cl.
  *B60Q 1/04*          (2006.01)
  *G01B 11/25*          (2006.01)
  *G06V 10/145*          (2022.01)

(52) U.S. Cl.
  CPC ........ *G01B 11/2518* (2013.01); *G06V 10/145*
                    (2022.01)

(58) Field of Classification Search
  CPC .......... B60Q 1/04; B60Q 1/143; B60Q 1/247;
                    B60Q 2400/50; G01B 11/2518; G01B
                    11/25
  See application file for complete search history.

(56)              References Cited

U.S. PATENT DOCUMENTS

| | | | |
|---|---|---|---|
| 10,632,899 B2 | 4/2020 | Neukam | |
| 10,974,642 B2 | 4/2021 | Boilevin et al. | |
| 11,285,865 B2* | 3/2022 | Koehler | H05B 47/125 |
| 2008/0063239 A1* | 3/2008 | Macneille | G06V 10/145 |
| | | | 382/104 |
| 2009/0309710 A1* | 12/2009 | Kakinami | G06V 20/586 |
| | | | 348/148 |
| 2013/0147957 A1* | 6/2013 | Stein | G06V 20/58 |
| | | | 348/148 |
| 2014/0043483 A1* | 2/2014 | Schuder | H04N 7/18 |
| | | | 348/148 |
| 2014/0152823 A1* | 6/2014 | Breed | B60R 21/013 |
| | | | 348/148 |
| 2017/0158128 A1* | 6/2017 | Jiang | B60Q 9/008 |
| 2019/0220677 A1 | 7/2019 | Lipson et al. | |
| 2021/0027102 A1* | 1/2021 | Ogura | G06V 20/56 |

FOREIGN PATENT DOCUMENTS

| | | |
|---|---|---|
| CN | 110573377 A | 12/2019 |
| DE | 102019008840 A1 | 8/2020 |
| JP | 2020030750 A * | 2/2020 |
| WO | 2017162644 A1 | 9/2017 |

OTHER PUBLICATIONS

JP-2020030750-A Machine translation (Year: 2020).*
European Patent Office, International Search Report and Written Opinion of corresponding International Application No. PCT/EP2022/066771, dated Aug. 23, 2022.
China Patent Office, Office Action (with English Translation) of corresponding Chinese Patent Application No. 202280043217.3, dated Apr. 13, 2026, 12 pages.

* cited by examiner

METHOD FOR DETECTING AN OBJECT IN A ROAD SURFACE, METHOD FOR AUTONOMOUS DRIVING AND AUTOMOTIVE LIGHTING DEVICE

TECHNICAL FIELD

This invention is related to the field of automotive luminous devices, and more particularly, to the ones used in autonomous driving conditions.

BACKGROUND OF THE INVENTION

Autonomous driving is being developed to provide vehicles which are capable of sensing their environment and moving safely with a reduced human input.

To achieve this goal, these autonomous vehicles combine a variety of sensors to perceive their surroundings. Advanced control systems receive the sensors data and provide a construction of the surroundings of the vehicle to identify appropriate navigation paths, as well as obstacles and relevant signaling.

A classification system with six levels, ranging from fully manual to fully automated systems, was published in 2014 by SAE International, an automotive standardization body, as J3016. This classification is based on the amount of driver intervention and attentiveness required, rather than the vehicle's capabilities, although these are loosely related. In 2016, SAE updated its classification, called J3016_201609.

In Level 3 of this classification, the driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so.

Luminous performance of lighting devices are essential for the sensors to receive all the relevant information necessary to achieve this driving mode, especially at night.

BRIEF SUMMARY OF THE INVENTION

The present invention provides a solution for this problem by means of a method for detecting an object in a road surface, the method comprising the steps of projecting a light pattern on the road surface;

acquiring an image of the projected light pattern;

detecting a shadow in the acquired image; and use some features of the shadow to obtain information about features of an object.

In this method, a lighting device projects a light pattern on the road surface where the object is intended to be detected. An image device, such as a camera, acquires the image of the road illuminated by this light pattern. In this image, acquired by the image device, the object causes a shadow. This shadow is easily identifiable, since the processing unit which analyses the image has information about the light pattern projected by the lighting device. If a black zone is present in the image but the light pattern did not contain this black zone, this black zone is identified as a shadow created by the existing object. The shape and dimensions of the shadow are used to provide information about the detected object and its importance. Thus, this lighting method can be used as an aid to night autonomous driving, thus improving safety and accuracy in the object detection.

In some particular embodiments, the light pattern is a high beam pattern.

With this method, current lighting devices may be used for the step of projecting the light pattern over the surface, there is no need to project an additional light pattern by an additional light module. Thus, the system is simpler and the user does not notice any change.

In some particular embodiments, the light pattern is a uniform pattern.

A uniform pattern may be used for a more reliable detection of the object. The uniform pattern, which comprises a plurality of light pixels having the same luminous intensity, provides an easily identifiable shadow when an object is detected, so the processing unit uses less resources to identify and process the shadow.

In some particular embodiments, the light pattern is projected by a headlamp.

The method may be used for lighting the road ahead the vehicle, such as in highway mode or in any other similar driving mode.

In some particular embodiments, the light pattern is projected by a reverse light.

The method may also be used for lighting the road behind the vehicle, like in a parking operation or in any other reverse manoeuvring.

In some particular embodiments, the method further comprises the step of modifying the light pattern when an object is detected.

A simple light pattern, such as a uniform pattern or a standard light pattern, such as high beam, may be used to detect the presence of an object. However, once that this presence has been detected, a more specific light pattern may be used for a better obtention of the size and shape of the object.

In some particular embodiments, the modified light pattern includes light stripes. In some particular embodiments, the light stripes are horizontal, vertical or diagonal light stripes.

Light stripes are useful for detecting the dimensions of the object. Horizontal light stripes are suitable for detecting the width of the object, while vertical stripes are suitable for detecting the height of the object. Diagonal stripes combine the advantages of both.

In some particular embodiments, the modified light pattern has a higher luminous intensity than the original light pattern in the zone where the object is detected.

Another way of modifying the light pattern is to increase the luminous intensity, to cause a further contrast increase between the lighted portion and the shadow.

In some particular embodiments, the features of the shadow contain the position, the width and/or the height of the object.

These features are useful for assessing the relevance of the detected object, in order to decide the best decision possible.

In some particular embodiments, the method comprises a first step of providing the lighting device with a labelled database of debris objects, wherein the database contains objects with different sizes, materials, shapes, orientations and additional shadows;

the step of use some features of the shadow to obtain information about features of an object is carried out by a machine learning process; and the machine learning process includes a pre-processing of the images, which includes an image equalization to enhance the contrast between the lighted surface and the shadow created thereby.

The image equalization improves the contrast, thus boosting the learning process.

In a second inventive aspect, the invention provides a method for autonomous managing of a vehicle, comprising the steps of performing the detection of an object with a method according to the first inventive aspect;

using the obtained features of the object to decide a suitable vehicle maneuver;

checking if the vehicle maneuver can be performed in security conditions; and performing the maneuver.

The method for detecting an object may be used for a method for the autonomous driving of a vehicle. When the object is detected, the detection method provides the necessary features that allow the adoption of a correct maneuver to avoid collision.

In a further inventive aspect, the invention provides an automotive lighting device comprising a plurality of solid-state light sources, configured to project the light pattern in a method according to a previous inventive aspect;

an image sensor configured to acquire an image of the projected light pattern in a method according to a previous inventive aspect; and processing unit configured to perform the rest of the steps of a method according to a previous inventive aspect.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, many light sources may be managed at the same time.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
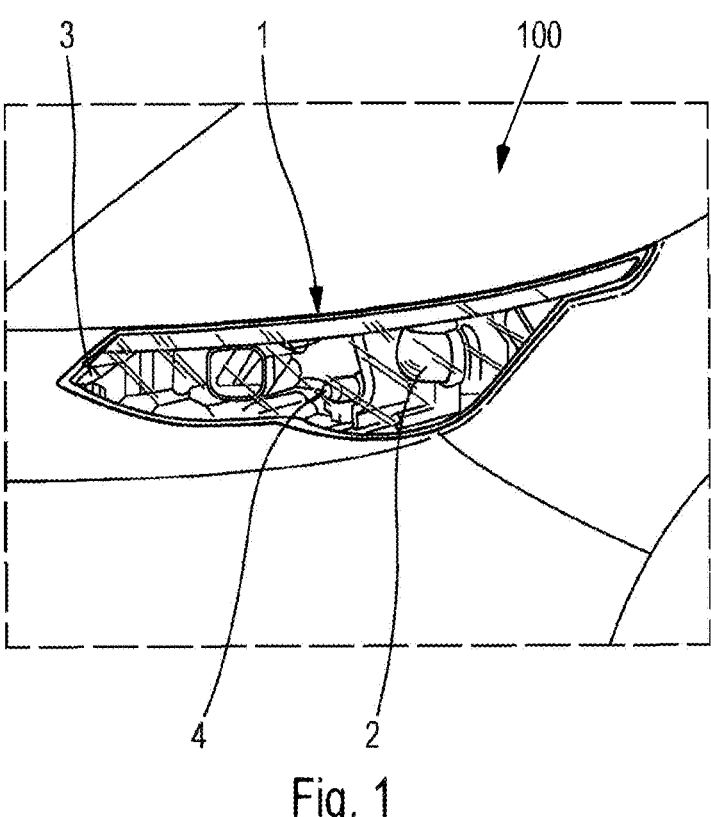
FIG. 1 shows a general perspective view of an automotive lighting device according to the invention.

In these figures, the following reference numbers are used:

1 Headlamp
2 LEDs
3 Control unit
4 Camera
5 Road surface
6 Light pattern
7 Shadow
8 Light stripes
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This headlamp 1 is installed in an automotive vehicle 100 and comprises a matrix arrangement of LEDs 2, intended to provide a light pattern;

a control unit 3 to perform a control of the operation of the LEDs 2; and a camera 4 intended to provide some external data.

This matrix configuration is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometer.

The monolithic matrix is coupled to the control center so as to control the generation and/or the projection of a pixelated light beam by the matrix arrangement. The control center is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Figure 2:
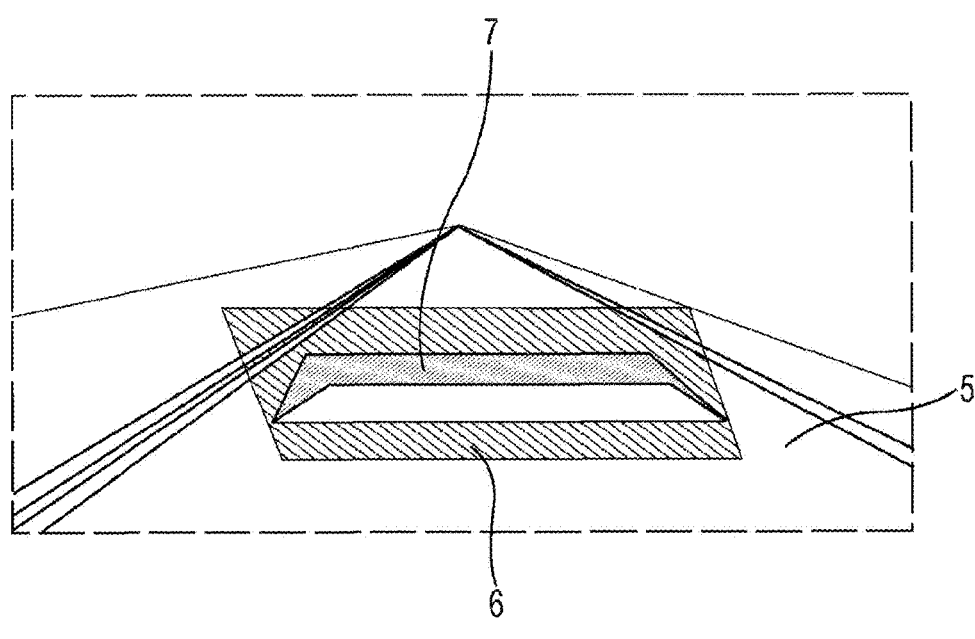
FIG. 2 shows an example of some steps of a method according to the invention.

FIG. 2 shows some steps of the operation of such an automotive lighting device. In this figure, a uniform light pattern 6 is shown projected on the road 5. This uniform light pattern 6 comprises a matrix of light pixels, all of them having the same luminous intensity.

Each 0.2 seconds, the camera of the lighting device acquires image data of the projected light pattern. When an object is present on the road, the acquired image data contains a shadow 7 caused by this object, since the camera is placed at a different height from the lighting device.

At this stage, there are two options. First one is analyzing the image as such, with the homogeneous light pattern and the shadow, and second one, illustrated in FIG. 3, is modifying the light pattern for a better identification of the object.

Figure 3:
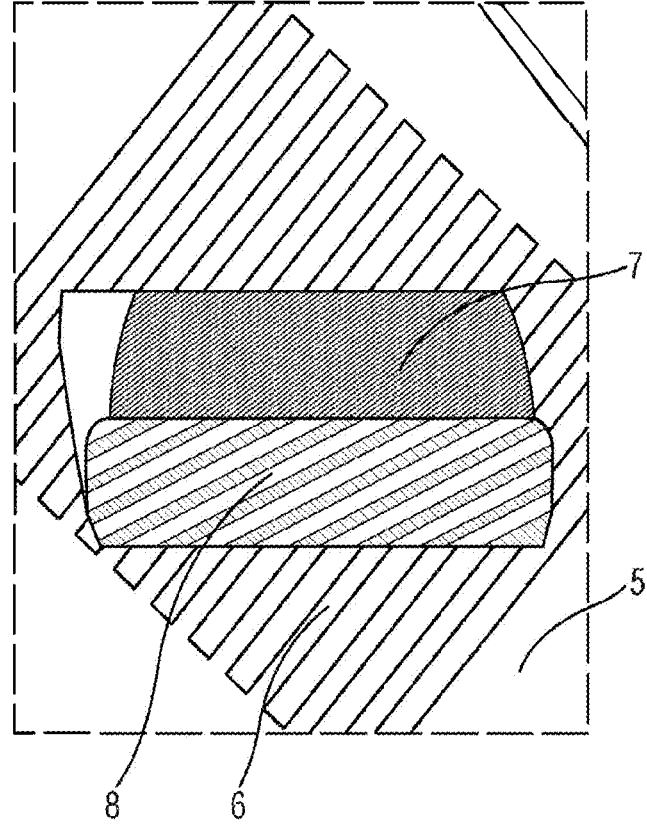
FIG. 3 shows a modified light pattern in a method according to the invention.

In this FIG. 3, a modified light pattern is projected over the object, for a better identification of their features by the processing unit. This figure shows the modified light pattern, which comprises light stripes 8, which are deformed by the presence of the object. In this case, the modified light pattern comprises diagonal lines, but in other embodiments, other types of light patterns may be used. The object modifies the angle and frequency of the diagonal lines, so that the processing unit may obtain, more accurately, the shape and dimensions of the object.

In any of these examples (image of the light pattern without modifications or image of the modified light pattern), the processing unit receives the image and processes it.

At these stages, there are different methods for the processing unit to analyze the shadow.

First optional stage comprises performing an image equalization, to enhance the contrast between the lighted surface and the shadow created thereby. This enhanced contrast will be useful for the processing unit, for a better identification and quantification of the shadow dimensions.

Second optional stage is the use of machine learning. As described above, the processing unit may undergo a supervised learning process before being installed in the automotive vehicle. This comprises the fact that a database of debris objects is provided within a preliminary training stage.

Second optional stage is the use of machine learning. As described above, the processing unit may undergo a supervised learning process before being installed in the automotive vehicle. This comprises the fact that a database of debris objects is provided within a preliminary training stage.

The processing unit comprises a convolutional neural network with some convolutional layers, which operate on the input (the image from the database). This network comprises skip connections to propagate input features faster through residual connections. This network also comprises a final fully-connected layer.

One operational example means that, since objects present in the images are limited, the network learns to classify a provided shadow within a predefined set of surfaces range. The task is that the network estimates the surface as if it was a probability function.

An alternative arrangement of the convolutional neural network comprises some convolutional blocks, each convolutional block comprising several convolutional layers and a max pool layer, which operate on the input (the image from the database). The network further comprises the same number of deconvolutional blocks, each block comprising an unsampling layer and convolutional layers. The output of this process will lead to the dimensions of the object zone.

This invention may be used with different light patterns. Homogeneous one has its own advantages, but using, e.g., the high beam is advantageous in the sense that no additional light projectors are needed to perform the method.

This invention may also be used in different situations: the light may be projected by the headlamp, but it may also be projected by a rear lamp, such as a reverse light. This example would be useful when parking the car, and an accurate map of the obstacles would be needed for an autonomous operation.

This invention may also be used when dealing with the object. The processing unit, once that has detected and identified the presence, position, orientation and size of the object, decides the best way of overcoming it: either by changing the lane, or by decreasing the speed, or even by totally stopping the vehicle. Autonomous driving steps are performed according to the invention for the most suitable operation that avoids being damaged by the object. However, sometimes, it has to check if this maneuver is possible (because there are no nearby vehicles) before performing it.

What is claimed is:

1. A method of detecting an object in a road surface, comprising:

an autonomous vehicle system;

a luminous device having a plurality of light pixels;

an image sensor;

a processing unit applying a machine learning process that controls:

wherein the luminous device projects a light pattern on the road surface;

wherein the image sensor acquires an image of the projected light pattern;

wherein the image sensor detects a shadow in the image being acquired; and wherein the processing unit uses a portion of features from the shadow to obtain information about object features being detected in order to control results of a modified light pattern being projected on the road surface.

2. The method according to claim 1, wherein the light pattern is a high beam pattern.

3. The method according to claim 1, wherein the light pattern is a uniform pattern.

4. The method according to claim 1, wherein the light pattern is projected by a headlamp.

5. The method according to claim 1, wherein the light pattern is projected by a reverse light.

6. The method according to claim 1, further comprising modifying the light pattern when an object is detected.

7. The method according to claim 6, wherein the modified light pattern includes light stripes.

8. The method according to claim 7, wherein the light stripes are horizontal, vertical or diagonal light stripes.

9. The method according to claim 6, wherein the modified light pattern has a higher luminous intensity than the original light pattern in the zone where the object is detected.

10. The method according to claim 1, wherein the features of the shadow contain the position, the width and/or the height of the object.

11. The method according to claim 1, further comprising providing a lighting device with a database of debris objects, wherein the database contains the debris objects about different sizes, materials, shapes, orientations and additional shadows;

wherein utilizing a portion of features of the shadow to obtain information about the object features is carried out by the machine learning process; and the machine learning process includes a pre-processing of each image, which includes an image equalization to enhance a contrast between a lighted surface and the shadow created thereby.

12. A method for managing an autonomous vehicle, comprising:

a luminous device, a plurality of light pixels, an image sensor;

a processing unit with a machine learning process that controls the processing unit to perform the following:

performing detection of an object through the image sensor combined with projecting a light pattern through the luminous device on a road surface;

acquiring an image of the light pattern being projected through the image sensor;

detecting a shadow in the image being acquired; and utilizing a portion of features from the shadow to obtain information about object features;

utilizing the object features through the machine learning process to decide a suitable vehicle maneuver;

checking through the machine learning process if the suitable vehicle maneuver can be performed in secure conditions; and performing the suitable vehicle maneuver through the processing unit controlling an autonomous vehicle.

13. An automotive lighting device of an autonomous vehicle system comprising:

a plurality of solid-state light sources; an image sensor;

a processing unit having a machine learning process;

wherein the plurality of solid-state light sources are adapted to project a light pattern on a road surface controlled by the processing unit;

wherein the image sensor is controlled by the processing unit to acquire an image of the light pattern being projected; and the processing unit is controlled to detect a shadow in the image being acquired and and uses a portion of features from the shadow to obtain information about object features being detected by the image sensor.

* * * * *